২,৮৫৩,৪৮৭

2,853,487
17-(2-PIPERIDYLMETHYL)-ANDROSTANEDIOLS

Moses Wolf Goldberg and Lester Mischa Jampolsky, Upper Montclair, N. J., assignors to Hoffmann-La Roche Inc., Nutley, N. J., a corporation of New Jersey No Drawing. Application March 9, 1956
Serial No. 570,431

8 Claims. (Cl. 260—239.5)

This invention relates to synthetic basic steroids related to androstanediol. More particularly, this invention relates to 17-(2-piperidylmethyl)-androstanediols which can be represented by the following structural formula

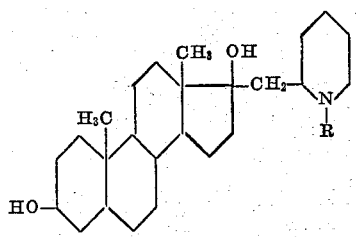

wherein R represents hydrogen or lower alkyl.

Also included within the scope of this invention are salts formed from the basic steroids of the above formula. Certain intermediates, i. e. 17-(2-pyridylmethyl)-5-androstenediol compounds, used in the synthesis of the novel compounds having the structural formula shown above, are themselves novel and these intermediates are likewise included within the scope of the present invention.

The compounds of this invention can be produced in the following manner. Dehydroisoandrosterone ($\Delta^5$-androstene-3$\beta$-ol-17-one) is condensed with 2-picolyl lithium at elevated temperature, for example in 2-picoline as a solvent, to obtain 17-(2-pyridylmethyl)-5-androstene-3,17-diol. The compound thus formed may be quaternized with a quaternizing agent such as a lower alkyl halide, e. g. methyl bromide, to obtain the corresponding methobromide. Hydrogenation of the methobromide yields an N-methylpiperidine derivative. Quaternization of 17-(2-pyridylmethyl) - 5 - androstene - 3,17-diol with lower alkyl halides, such as ethyl bromide, propyl bromide, etc., with subsequent hydrogenation produces homologous N-alkylpiperidine derivatives.

Hydrogenation of 17-(2-pyridylmethyl)-5-androstene-3,17-diol in the presence of platinum oxide catalyst produces the secondary amine 17-(2-piperidylmethyl)-3,17-androstanediol. Further hydrogenation of the androstanediol thus obtained in the present of formaldehyde also produces an N-methylpiperidine derivative. Reaction of 17-(2-piperidylmethyl)-3,17-androstanediol with acetic anhydride in a solvent such as pyridine produces 17 - (1 - acetyl - 2 - piperidylmethyl) - 3 - acetoxy - 17 - androstanol. The last named compound in turn may be reduced with lithium aluminum hydride to produce a product corresponding to the above structural formula wherein R represents ethyl. Homologous N-alkyl compounds may be produced by reacting 17-(2-piperidylmethyl)-3,17-androstanediol with propionic anhydride, butyric anhydride, etc., and reducing the acylated product obtained with lithium aluminum hydride.

Compounds corresponding to the structural formula represented above as well as the intermediates containing a pyridylmethyl substituent in the 17-position form acid addition salts and quaternary ammonium salts. The acid addition salts are produced by reacting the basic compound with the appropriate acid in a solvent. Representative inorganic and organic acids include the hydrohalic acids, e. g. hydrochloric, hydrobromic, etc., sulfuric, phosphoric, lactic, tartaric, alkanesulfonic, e. g. ethanesulfonic, camphorsulfonic, mandelic, citric and maleic acids. The quaternary ammonium compounds are produced by reacting the basic compound with a quaterizing agent such as a lower alkyl halide, a lower alkyl sulfate, a lower alkyl p-toluenesulfate, and other quaternizing agents conventionally employed in therapeutic preparations. A preferred class of salts constitutes pharmaceutically acceptable, non-toxic acid addition salts and quaternary ammonium salts of the class described above conventionally utilized for therapeutic applications.

The products of this invention are useful as cardioactive agents, more particularly, they are useful as antifibrillatory agents. The pharmaceutically active substances may be administered in therapeutic doses in conventional dosage forms, orally or parenterally.

The compounds of this invention have asymmetric carbon atoms and the various stereoisomers are included within the scope of this invention.

The following examples are illustrative of the products of this invention and methods for their synthesis. All temperatures are in degrees centigrade.

Example 1

To 16.8 grams of lithium foil suspended in 1200 ml. of dry ether were slowly added with stirring, 188.1 grams of bromobenzene in 300 ml. of dry ether. After stirring and refluxing for 90 minutes, 300 ml. of dry ether, containing 99 grams of 2-picoline, were slowly added, followed, after 15 minutes, by the addition of 86.4 grams of dehydroisoandrosterone in 1.2 liters of 2-picoline. While stirring, the ether was distilled off and the reaction temperature rose to 95°. After stirring for 20 minutes at this temperature, the reaction mixture was cooled and diluted with 1.5 liters of cold 6 N HCl. The precipitate, 17 - (2 - pyridylmethyl) - 5 - androstene - 3$\beta$, 17$\beta$ - diol hydrochloride, was separated by filtration and an aliquot was purified by crystallization from methanol, M. P. 230–243° with decomposition.

Calculated for $C_{25}H_{35}O_2N.HCl$: C, 71.83; H, 8.68. Found: C, 71.21; H, 8.63.

The hydrochloride obtained above was dissolved in one liter of ethanol and 50 ml. of 15 M ammonium hydroxide were added. The mixture was warmed until clear and then filtered from a small amount of impurities. To the filtrate were added 300 ml. of 15 M ammonium hydroxide, followed by two liters of water. After cooling, the crystalline base, 17-(2-pyridylmethyl)-5-androstene-3$\beta$, 17$\beta$-diol, was separated by filtration and recrystallized from dilute ethanol, M. P. 179–184°.

Calculated for $C_{25}H_{35}O_2N$: C, 78.69; H, 9.25. Found: C, 78.51; H, 9.01.

Example 2

To 5.57 grams of 17-(2-pyridylmethyl)-5-androstene-3$\beta$,17$\beta$-diol in 150 ml. of acetone were added 32 ml. of acetone containing 14 grams of methyl bromide. After standing for 18 hours at 5°, the reaction mixture was refluxed for two hours and then cooled. The crystals which formed were separated by filtration and recrystallized from a mixture of methanol and ether. The purified product, the methobromide of 17-(2-pyridylmethyl)-5-androstene-3$\beta$,17$\beta$-diol, melted at 235.5–5.239°.

Calculated or $C_{26}H_{38}O_2NBr$: C, 65.53; H, 8.04. Found: C, 65.65; H, 8.27.

Example 3

To 17.2 grams of 17-(2-pyridylmethyl)-5-androstene-3$\beta$,17$\beta$-diol in 300 ml. of methanol were added 8 ml. of 6 N HCl and the mixture was hydrogenated in the presence of 1.6 grams of Adams' platinum oxide catalyst at 100 lbs./sq. in. and 50°. After the hydrogen uptake had ceased, the catalyst was separated by filtration and the filtrate evaporated to dryness in vacuo. The residue so obtained was slurried with water, made alkaline and extracted with chloroform. The dried chloroform extract was evaporated to dryness in vacuo and the resulting residue crystallized from ethyl acetate. The purified 17-(2-piperidylmethyl)-3β,17β-androstanedoil melted at 209–213°.

Calculated for $C_{25}H_{43}O_2N$: C, 77.07; H, 11.13. Found: C, 76.95; H, 10.84.

The hydrochloride of the 17-(2-piperidylmethyl)-3β,17β-androstanediol was prepared by reacting the diol with HCl in ethanol. It crystallized with a half mole of water. The purified product decomposed at about 320°.

Calculated for $C_{25}H_{43}O_2N \cdot HCl \cdot \frac{1}{2}H_2O$: C, 69.01; H, 10.43. Found: C, 68.96; H, 10.32.

To 100 grams of 17-(2-piperidylmethyl)-3β,17β-androstanediol in one liter of methanol were added 34.8 grams of 73% lactic acid. The residue obtained by evaporation of this mixture to dryness in vacuo was taken up in 500 ml. of refluxing acetone and 2.53 liters of distilled acetonitrile were added. The precipitate which formed on cooling was separated by filtration and dried for 22 hours at 80° at 15 mm. The product, 17-(2-piperidylmethyl)-3β,17β-androstanediol lactate hemihydrate, melted at 120°–123°.

Calculated for $C_{28}H_{49}O_5N \cdot \frac{1}{2}H_2O$: C, 68.81; H, 10.31; O, 18.01. Found: C, 68.61; H, 10.41; O, 18.33.

The following additional acid salts of the above base were synthesized in a similar manner: maleate (melting range 126°–160°), acid sulfate (M. P. 315°–320°), ethanesulfonate (M. P. 201°–204°), and camphorsulfonate (M. P. (236°–239°).

Example 4

To 5 grams of 17-(2-piperidylmethyl)-3β,17β-androstanediol in 30 ml. of dry pyridine at 60° were added 25 ml. of acetic anhydride. After standing at 30° for 18 hours, the reaction mixture was poured into 200 ml. of water and brought to the boiling point for a moment. After cooling, the solidified oil was separated and crystallized from acetonitrile. The purified 17-(1-acetyl-2-piperidylmethyl)-3β-acetoxy-17β-androstanol melted at 193–195°.

Calculated for $C_{29}H_{47}O_4N$: C, 73.53; H, 10.00; acetyl, 18.18. Found: C, 73.27; H, 9.58; acetyl, 17.98.

Example 5

To 2.75 grams of 17-(1-acetyl-2-piperidylmethyl)-3β-acetoxy-17β-androstanol in 350 ml. of dry ether was added a slurry of 2.2 grams of lithium aluminum hydride in 300 ml. of ether. After being stirred and refluxed for one hour, 30 ml. of ethyl acetate were added to decompose the excess hydride. One hundred ml. of 6 N NaOH were then added and the organic layer was separated. The aqueous solution was extracted well with ethyl acetate and the combined organic solutions were dried over anhydrous sodium sulfate then evaporated to dryness in vacuo. The residue so obtained was crystallized from methanol. The purified product, 17-(1-ethyl-2-piperidylmethyl)-3β,17β-androstanediol, melted at 250–261°.

Calculated for $C_{27}H_{47}O_2N$: C, 77.64; H, 11.64. Found: C, 77.78; H, 11.47.

Example 6

To 60 grams of 17-(2-piperidylmethyl)-3β,17β-androstanediol in 380 ml. of glacial acetic acid were added 330 ml. of water, 164 ml. of 36% formaldehyde solution and 22 grams of 10% palladium-charcoal. After hydrogenating at 1500 lbs./sq. in. and 80°, the reaction mixture was cooled, the catalyst separated and 820 ml. of 6 N NaOH were added. The precipitation of the base, 17-(1-methyl-2-piperidylmethyl) - 3β,17β-androstanediol, was completed on the further addition of 500 ml. of ice water. The gummy precipitate was filtered off and crystallized from ethyl acetate. The purified product melted at 187–193°.

Calculated for $C_{26}H_{45}O_2N$: C, 77.36; H, 11.24. Found: C, 77.49; H, 10.79; C, 77.66; H, 10.85.

The hydrochloride of the above obtained compound was prepared by adding an ethanolic-HCl solution to the compound obtained above in ethanol. The crystalline product which formed was recrystallized from ethanol-ether. The purified product sintered at 300° and decomposed at 315–329°.

Calculated for $C_{26}H_{45}O_2N \cdot HCl$: C, 70.95; H, 10.54. Found: C, 71.12; H, 10.23.

Example 7

To 2.1 grams of 17-(1-methyl - 2 - piperidylmethyl)-3β,17β-androstanediol in 300 ml. of acetone were added 4.5 grams of methyl iodide. The crystals which formed on warming for a moment were separated and recrystallized from methanol. The purified methyl iodide of 17-(1 - methyl - 2 - piperidylmethyl) - 3β,17β - androstanediol melted with decomposition at 296–297°.

Calculated for $C_{27}H_{48}O_2NI$: C, 59.44; H, 8.87. Found: C, 59.21; H, 8.54.

We claim:

1. A member of the group consisting of 17-(2-pyridylmethyl)-5-androstene-3,17-diol and acid addition salts and quaternary ammonium salts thereof.

2. 17-(2-pyridylmethyl)-5-androstene-3β,17β-diol.

3. 17-(2-pyridylmethyl) - 5 - androstene-3β,17β-diol methobromide.

4. 17(1-acetyl-2-piperidylmethyl) - 3β - acetoxy-17β-androstanol.

5. A compound of the group represented by the formula

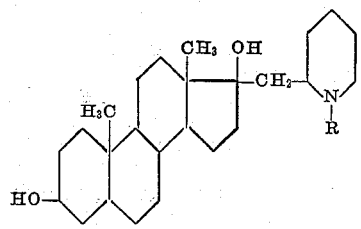

wherein R represents a member of the group consisting of hydrogen and lower alkyl; and acid addition salts and quaternary ammonium salts thereof.

6. A compound represented by the formula

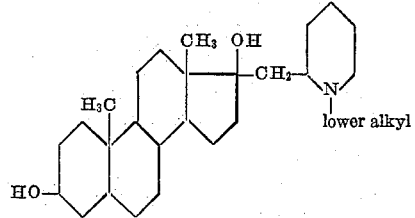

7. 17-(2-piperidylmethyl)-3β,17β-androstanediol.

8. 17 - (2 - piperidylmethyl) - 3β,17β - androstanediol lactate.

References Cited in the file of this patent

UNITED STATES PATENTS

| | | |
|---|---|---|
| 2,562,194 | Julian | July 31, 1951 |
| 2,750,380 | Dodson et al. | June 12, 1956 |
| 2,752,337 | Herr | June 26, 1956 |

OTHER REFERENCES

Goldberg et al.: Helv. Chim. Acta, vol. 23, pp. 376–384 (1940).

Heusser et al.: Helv. Chim. Acta, vol. 33, pp. 1093–1105 (1950).